April 26, 1966  K. J. DAVIS  3,247,733

MACHINE TOOL SWITCH ACTUATION

Filed Sept. 16, 1963  2 Sheets-Sheet 1

INVENTOR.
KENNETH J. DAVIS
BY
Whittemore, Hulbert
& Belknap
ATTORNEYS

April 26, 1966 K. J. DAVIS 3,247,733
MACHINE TOOL SWITCH ACTUATION

Filed Sept. 16, 1963 2 Sheets-Sheet 2

INVENTOR.
KENNETH J. DAVIS
BY *Whittemore, Hulbert & Belknap*
ATTORNEYS

3,247,733
MACHINE TOOL SWITCH ACTUATION
Kenneth J. Davis, Detroit, Mich., assignor to National Broach & Machine Company, Detroit, Mich., a corporation of Michigan
Filed Sept. 16, 1963, Ser. No. 309,012
7 Claims. (Cl. 74—102)

The present invention relates to machine tool switch actuation.

It is an object of the present invention to provide, in a machine tool having reversely repeated movement, mechanism including a reversible drive means, a reversing switch, means operable upon completion of the aforesaid movement in either direction to operate the reversing switch, and a safety switch connected to the reversing switch for control of the machine upon failure of the reversing switch.

It is a further object of the present invention to provide a machine tool as described in the preceding paragraph in which the reversely repeated movement is a back and forth traverse.

It is a further object of the present invention to provide a machine tool as described in the foregoing which comprises a reversing switch actuator, a safety switch actuator, and linkage interconnecting said actuators.

It is a further object of the present invention to provide a machine tool as described in the foregoing comprising in addition a manual reversing lever engageable with the reversing switch actuator, and adjustable stops to limit movement of the manual reversing lever so as to limit movement of the reversing lever and to prevent actuation of the safety switch thereby.

Other objects and features of the invention will become apparent as the description proceeds, especially when taken in conjunction with the accompanying drawings, illustrating a preferred embodiment of the invention, wherein.

Figure 1:
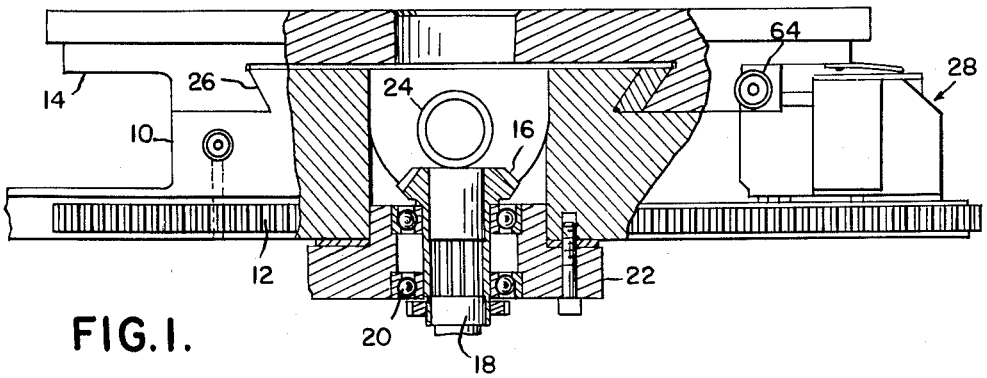
FIGURE 1 is an elevational view partly in section, showing a portion of a machine tool.

Referring first to FIGURE 1, the machine tool comprises a table 10 having arcuately disposed rack teeth 12 provided thereon to effect angular adjustment of the table 10 about a vertical axis. Mounted on the table 10 for back and forth reciprocation in a horizontal plane is a slide 14. Mounted on the table 10 is a bevel gear 16. The gear 16 is mounted for rotation in suitable bearings 20 carried by a bearing mounting block 22. A feed screw 24 is carried by the table 10 and is provided with a bevel gear (not shown) in mesh with the bevel gear 16. The screw 24 is supported against endwise movement relative to the table 10.

The slide 14 is provided with a depending nut (not shown) which engages the screw 24. Accordingly, rotation of the vertical drive shaft 18 and the bevel gear 16 results in rotation of the screw 24 which in turn imparts horizontal travel to the slide 14 parallel to the ways indicated at 26.

The shaft 18 is driven through conventional drive mechanism from an electric motor (not shown), the motor having reversing switches associated therewith as will subsequently be described in detail. In FIGURE 1 the reversing switches are indicated generally at 28.

Figure 4:
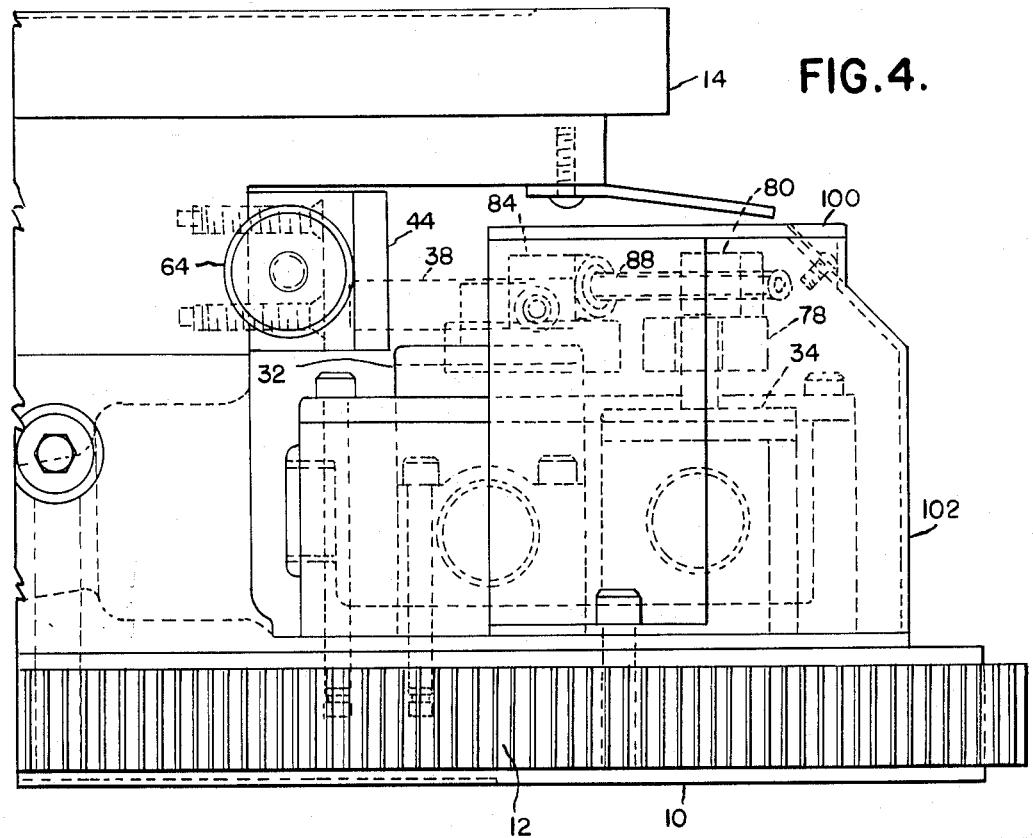
FIGURE 4 is an end view of the structure shown in FIGURE 2.
Figure 2:
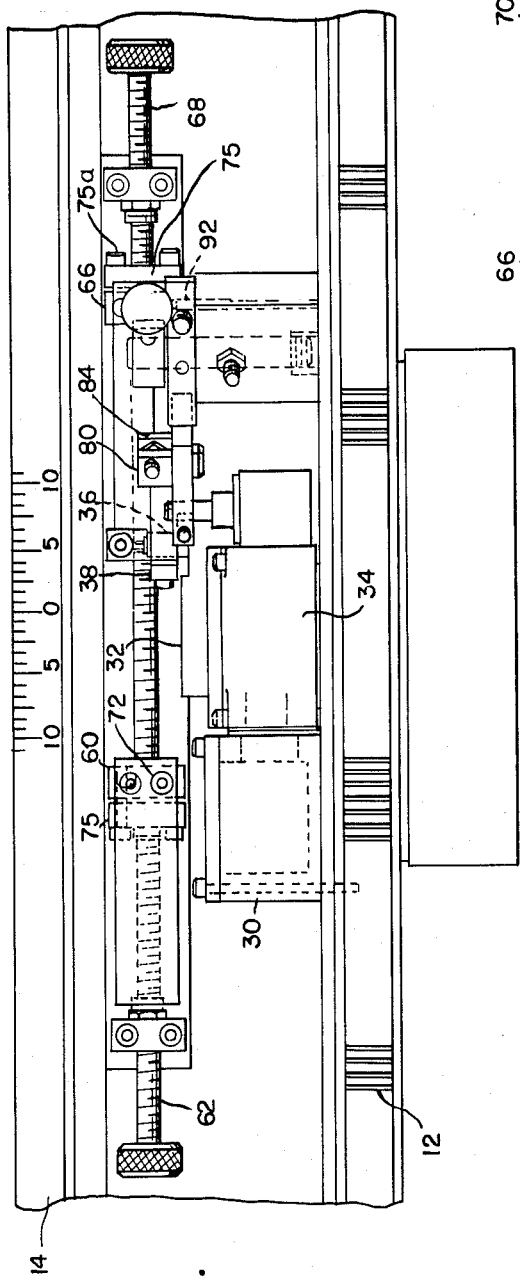
FIGURE 2 is a fragmentary elevational view of the machine tool illustrating switches and actuators therefor.
Figure 3:
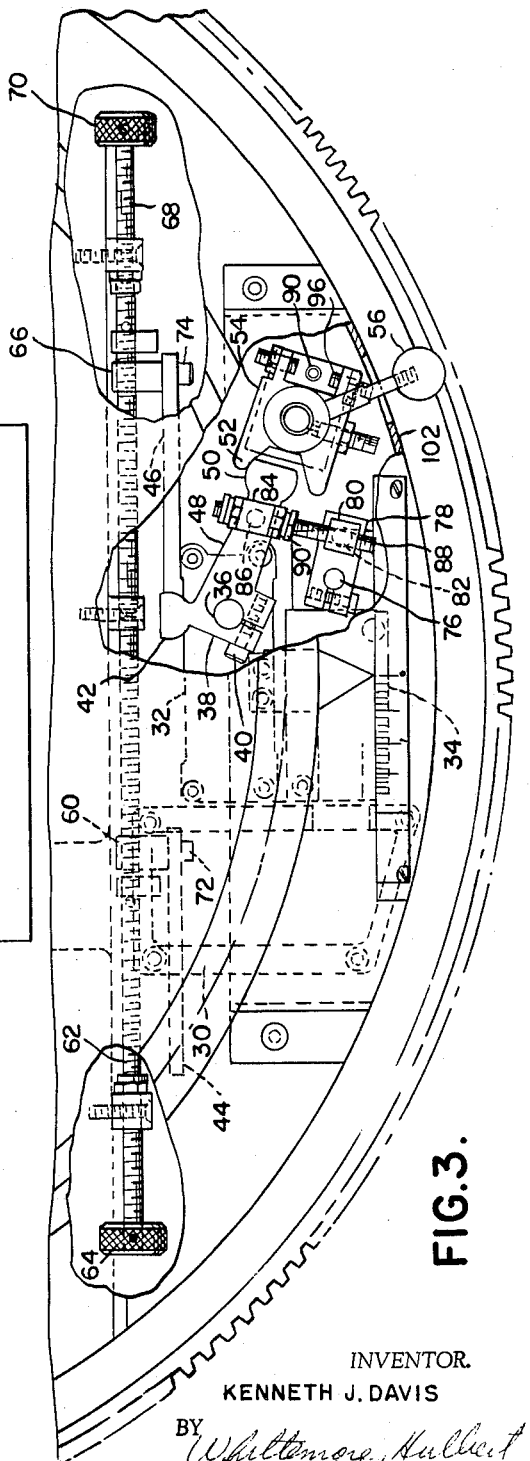
FIGURE 3 is a plan view with parts broken away, of the structure shown in FIGURE 2.

Referring now to FIGURES 2-4, the table 10 carries a wiring box 30 and a reversing limit switch 32 and a safety limit switch 34 are attached to the table 10. The reversing switch 32 has an upstanding post 36 to which an actuating lever 38 is secured by suitable means such as a clamping screw 40. The lever 38 includes a projection 42 engageable upon termination of a transverse stroke in either direction by one of the reversing dogs 44 or 46. The lever 38 also includes a laterally extending arm 48 having a head 50 engageable between spaced ears 52 provided on a manual reversing device 54 including the operator lever 56.

Means are provided for determining the point in travel at which the slide 14 is reversed and this means includes the dogs 44 and 46. The dog 44 is carried by a block 60 which has a threaded opening engaging the adjusting screw shaft 62, the outer end of which is provided with a knurled knob 64. Similarly, the dog 46 is carried by a block 66 having an internally threaded opening engaging the adjusting screw shaft 68 which has a knurled knob 70 attached thereto. The dog 44 is carried by two screws 72 and the dog 46 is carried also by two screws 74. With the parts mounted as best seen in FIGURE 3, it will be observed that the dog 46 is just actuating the lever 38 of the reversing switch 32. Upon reversal of the drive mechanism the slide 14 is traversed in the opposite direction until the dog 44 engages the projection 42 on the lever 38.

Fine adjustment of the location at which reversal of the slide 14 takes place is accomplished by adjustment of the threaded blocks 60 or 66. Backlash is eliminated by the use of threaded blocks 75, secured to blocks 60 and 66 by screws 75a. However, the dogs 44 may be repositioned 180 degrees so as to provide for off-center back and forth reciprocation of the slide 14.

It is desirable to provide a safety switch which is operable only upon failure of the reversing switch so as to prevent the possibility of damage to the machine or to expensive work pieces and/or tools carried thereby. The present invention is actually applied to a gear finishing machine in which a work gear carried by the slide 14 is rotatable in mesh with a gear-like tool carried by the machine.

In order to provide for quick actuation of the safety switch upon failure of the reversing switch, as may be necessary in cases where over-travel must be strictly limited, the safety switch 34 which is provided with a rotatable upstanding post 76 has an operating lever 78 clamped thereto. Fine adjustment linkage is provided interconnecting the levers 38 and 78. This linkage comprises a block 80 having a depending pin 82 rotatably received in the lever 78. A similar block 84 has a depending pin 86 received in the lever 38. A threaded link 88 is provided which is threaded into a transverse opening in the block 80 and which extends through an opening in the block 84. Means are provided for accurately controlling the effective length of the link 88 and this comprises adjusting nuts 90 on the threaded link 88 at opposite sides of the block 84. By this means it is possible to adjust the over-travel beyond actuation of the reversing switch 32 necessary to operate the safety switch 34 to an extremely small amount. In practice, it is found that the adjustment may be as close as .005 inch. This fine adjustment may be essential in cases where a shoulder gear is being finished on the machine. In this case it is necessary to machine as close to the shoulder of the gear as possible, but additional travel would result in interference and probable damage to the tool.

The manual reversing means 54 includes a stop pin 92 located between two adjustable abutments 96 which are set so that movement imparted to the lever 38 of the reversing switch by the ears 52 of the manual switch cannot cause sufficient travel thereof to operate the safety switch 34. This is desirable because operation of the safety switch commonly interrupts further automatic operation of the machine as a safety precaution and this is undesirable when reversal has been manual.

With the mechanism described it is possible to set the slide 14 for back and forth reciprocation in zones predetermined roughly by movement of the dogs 44 and 46 inwardly or outwardly of their respective pivot pins 72 and 74. Thereafter, the dogs are given a fine adjustment by rotating the screw shafts 62 and 68. The adjustable threaded link 88 is then adjusted to provide the required over-travel to operate the safety switch upon failure of the reversing switch, and the adjustable abutments 96 are adjusted so as to prevent operation of the safety switch by the manual switch operator 54.

Referring now to FIGURE 4, it will be observed that the reversing switches, their levers, and the means interconnecting them are housed generally within the space between the table or base 10 and the slide 14, the housing including in part a plate 100 and a front cover 102. The knobs 64 and 70 of the threaded shafts 62 and 68 which provide for adjustment of the switch actuating dogs are accessible at the open ends of the housing and permit adjustment of the stroke of the machine without removing the cover.

The drawings and the foregoing specification constitute a description of the improved machine tool switch actuation in such full, clear, concise and exact terms as to enable any person skilled in the art to practice the invention, the scope of which is indicated by the appended claims.

What I claim as my invention is:

1. In a machine tool comprising a stationary member and a support member movable in a reversely repeating cycle on said stationary member, reversible drive mechanism intermediate and operatively connecting said members, a reversing switch having a first operating lever thereon on one of said members, said reversing switch when actuated by relative movement between said members being effective to reverse said drive mechanism to reverse the direction of travel of said movable support member, a safety switch having a second operating lever thereon on said one member, said safety switch when actuated upon failure of said reversing switch being effective to reverse said drive mechanism to reverse the direction of travel of said movable support member, a pair of switch actuating dogs on the other of said members effective to operate said reversing switch at each end of the cycle, and adjustable means connecting the lever of said reversing switch to the lever of said safety switch to operate said safety switch with minimum over-travel upon failure of said reversing switch.

2. Apparatus as defined in claim 1 comprising a first block swivelled to said first lever, a second block swivelled to said second lever, and in which said adjustable means comprises a link connected between said levers.

3. Apparatus as defined in claim 2 in which said link comprises a threaded member and adjusting means threaded thereto.

4. Apparatus as defined in claim 1 in which said dogs comprise elongated abutments pivoted adjacent their ends for movement between two different operating positions.

5. Apparatus as defined in claim 1 comprising a pair of threaded shafts extending parallel to the direction of movement of said support member, support blocks threaded to said shafts, the reversing switch actuating dogs being on said blocks.

6. Apparatus as defined in claim 5, said dogs being eccentrically pivoted to said blocks for swinging movement between two different operating positions.

7. Apparatus as defined in claim 1, a manual switch actuator on said stationary member and adjustable stop means associated therewith to limit movement of the operating lever of said reversing switch to a range which will not operate said safety switch.

References Cited by the Examiner
UNITED STATES PATENTS

| | | | |
|---|---|---|---|
| 975,982 | 11/1910 | Murray | 90—48 |
| 2,349,602 | 5/1944 | Baldenhofer | 51—92 |
| 2,358,146 | 9/1944 | Clute | 200—50.3 |
| 2,370,701 | 3/1945 | Woodbury | 51—92 X |
| 2,390,978 | 12/1945 | Woodbury | 51—92 |
| 2,904,649 | 9/1959 | Ranson | 200—50.3 |
| 3,013,437 | 12/1961 | Harding | 74—96 |

BROUGHTON G. DURHAM, *Primary Examiner.*

D. H. THIEL, *Assistant Examiner.*